Figures 1, 2, 3:
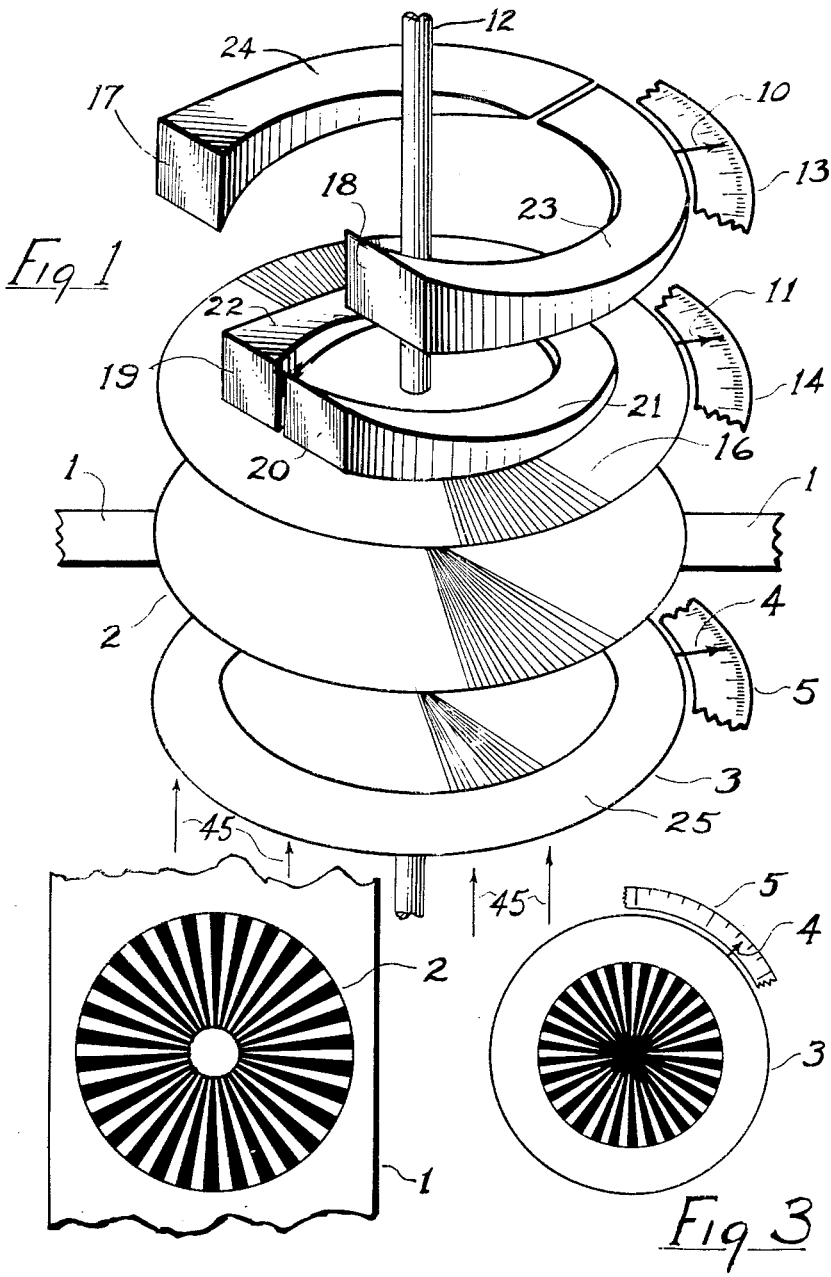

April 5, 1966 H. J. LAWRENCE 3,244,063
DISPLACEMENT-MEASURING APPARATUS
Filed Dec. 21, 1961 3 Sheets-Sheet 1

INVENTOR.
Harry J. Lawrence
BY
Ooms, McDougall and Hersh
Att'ys

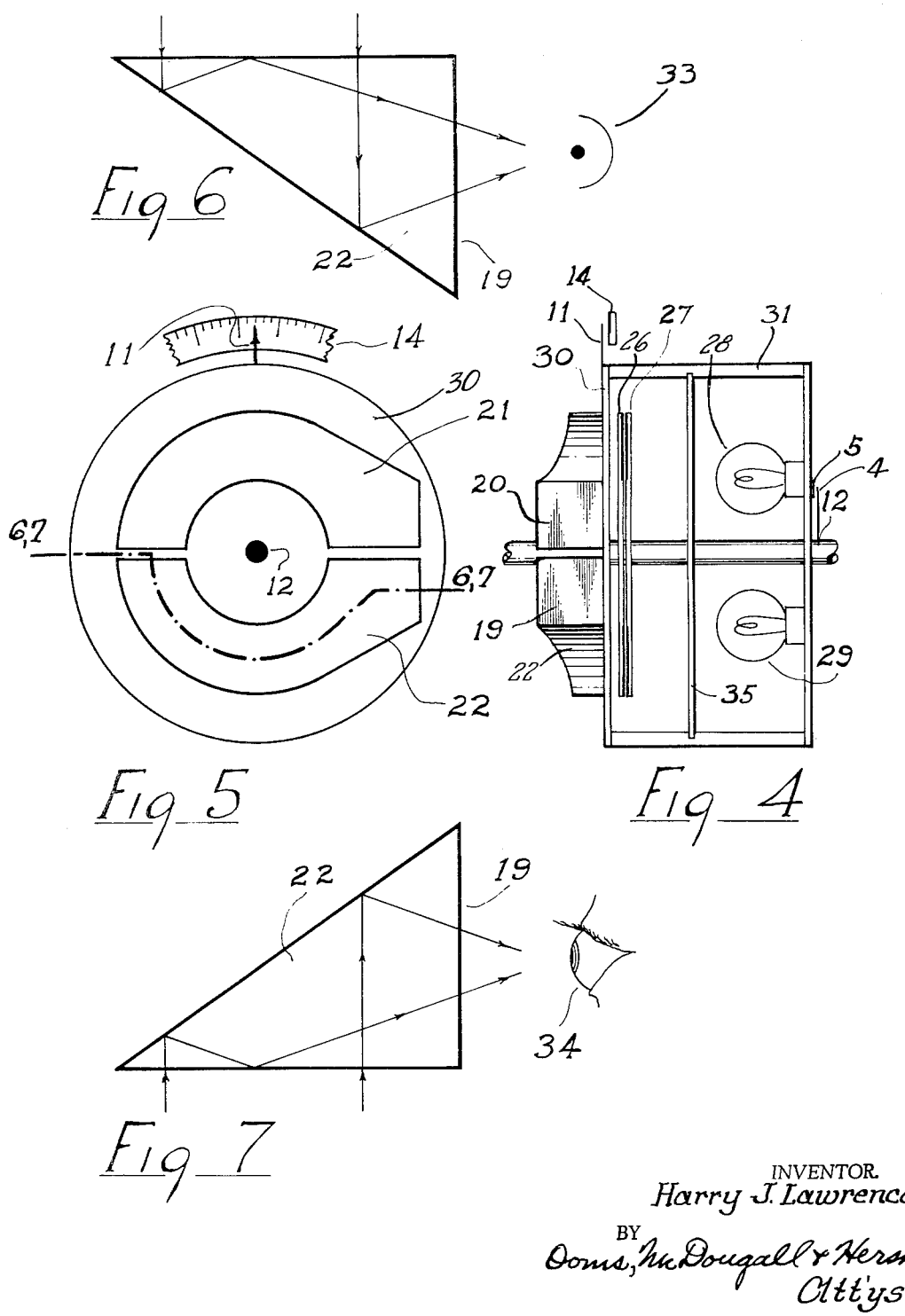

April 5, 1966    H. J. LAWRENCE    3,244,063
DISPLACEMENT-MEASURING APPARATUS
Filed Dec. 21, 1961    3 Sheets-Sheet 3
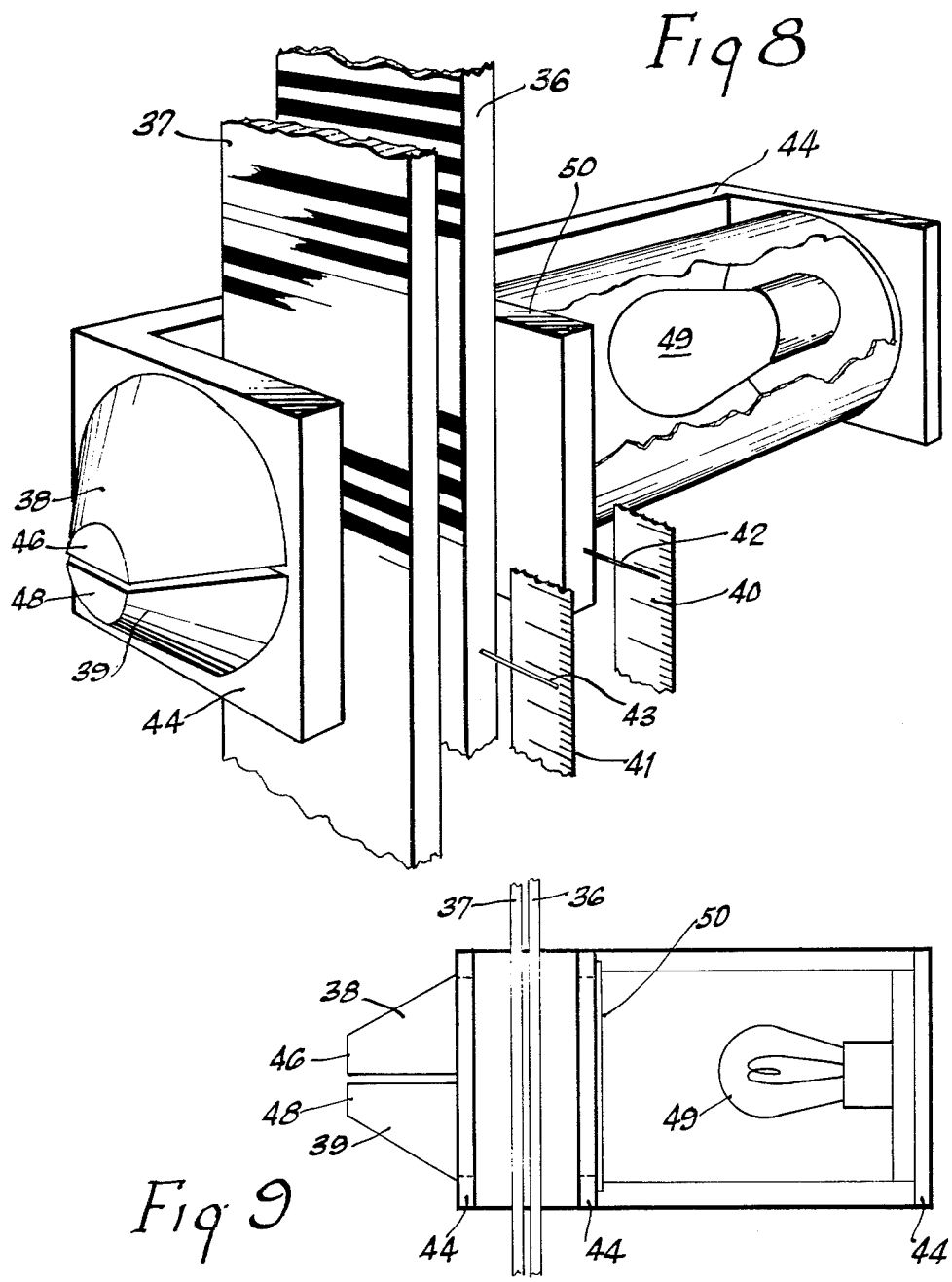
INVENTOR.
Harry J. Lawrence
BY
Ooms, McDougall and Hersh
Att'ys

United States Patent Office 3,244,063
Patented Apr. 5, 1966

3,244,063
DISPLACEMENT-MEASURING APPARATUS
Harry J. Lawrence, New Berlin, Wis., assignor to American Design Engineering Corp., Milwaukee, Wis., a corporation of Wisconsin
Filed Dec. 21, 1961, Ser. No. 161,214
1 Claim. (Cl. 88—14)

This invention relates to apparatus for measuring accurately the magnitudes of displacements, either linear or angular.

In particular, the invention concerns apparatus for measuring angular or linear displacements wherein means are provided for eliminating almost completely the effects of periodic error. This makes possible, with the present invention, the measurement of such displacements with a margin of error less, by several orders of magnitude, than the inherent periodic errors introduced by the machined parts and other components of the apparatus.

To accomplish the desirable result just defined is the object of the invention.

As is well known to persons skilled in the design of micrometers, goniometers, and like precision instruments, the measurements that can be made therewith are subject to three broad classes of error, commonly referred to in the art as random errors, progressive errors, and periodic errors.

Random errors, because they are wholly unsystematic, cannot by their very nature be compensated for; fortunately, however, the magnitude of random errors can by careful design be reduced to a very low level indeed.

Progressive errors are of the type which are inherently proportional to the magnitude of the displacement to be measured. A familiar example of such an error, encountered in the meausrement of time, is the quantity of time which a chronometer gains or loses per hour, day, or year. The effect of progressive errors on the accuracy of measurements can be substantially eliminated by appropriate compensation; thus, if a ship's navigator knowns that his chronometer loses three seconds per day, he will take that deviation from correct time into account in calculating the ship's position, simply adding to the time indicated on the instrument an increment of three seconds for each day that has elapsed since the chronometer was last synchronized with a primary time standard.

The third class of errors—periodic errors—are of the sort introduced by such factors as small departures from absolute straightness or roundness in rotating shafts. Errors of this kind can never be entirely eliminated in the manufacture of precision measuring devices, and they show up in such forms as patterns of repeating error in the marking of indicating scales, etc.

The magnitude of displacement over which a periodic error repeats itself is known in the art as the "period" of the error. Thus, for example, in a goniometer, a particular periodic error may repeat once every two degrees, meaning that the error is of zero magnitude at a given reference point, is again of zero magnitude at a progression of two-degree increments beyond the reference point, but has finite magnitude at all other points. Compensation for a given periodic error is rather easy when the magnitude of the displacement to be measured for substantially less than a single period but becomes increasingly difficult when the displacement is greater than one period.

Moreover, reducing the effects of periodic error is complicated by the fact that a given precision instrument may have a number of different sources of periodic error that respectively have different periods; under these circumstances, which are the rule rather than the exception, effective compensation for periodic error in precision measurements has in prior-art instruments been virtually impossible. Particularly is this true with instruments which in normal use are called upon to measure displacements of greatly differing magnitudes—i.e., goniometers, for example, wherein one measurement may involve an angle in the neighborhood of 300° and the next measurement may involve an angle of approximately 10° or 30° or 117°.

In the present invention, I have provided a means by which the effects of periodic errors can be substantiallly eliminated and measurements thus made possible with a minimum margin of error defined essentially by the magnitude of random error, it being understood of course that porgressive errors are compensated for in the usual manner. With my invention, this highly desirable result is obtained even though there may be a large number of different periodic errors involved, with widely differing periods.

In accomplishing this result, I make use of the mathematical principle that the sum of all periodic errors, when integrated over a large number of periods, approaches zero as a limit, being ever closer to zero as the number of periods is increased.

In the appended drawing, I have illustrated diagrammatically certain typical embodiments of apparatus utilizing the principles of my invention, including both embodiments designed for the measurement of angular displacement and rectilinear displacement. In the drawing, FIG. 1 is a diagrammatic illustration of an angle-measuring apparatus according to my invention, the drawing being shown in exploded form and with conventional supporting parts, etc., omitted, so as to make clear the principles on which the instrument operates. FIG. 2 is a simplified plan view of a stationary marked disc forming an important component of the FIG. 1 apparatus. FIG. 3 is a similar plan view of a rotatable disc used in the FIG. 1 apparatus, such disc being shown in company with the indicating pointer and calibrated scale that are used therewith. FIG. 4 is a side view, with part of the housing removed, of a somewhat simpler embodiment of my invention, also adapted for measuring angular displacements. FIG. 5 is an end view of the FIG. 4 apparatus, showing in more detail the structure of the rotatable integrator means of the FIG. 4 apparatus, together with its indicating pointer and calibrated scale. FIG. 6 diagrammatically represents a section of one of the integrators shown in FIG. 5, the section being taken along the line 6, 7–6, 7, to bring out the manner in which radiation such as light may enter the same at widely spaced points and be thereby directed onto a radiation-sensitive element such as a photo-cathode providing an electrical signal that varies according to the total amount of radiation reaching it. FIG. 7 is a diagrammatical sectional view of an integrator, the section also being along line 6, 7–6, 7, generally similar to FIG. 6 but showing that radiation collected by the integrator may be thereby directed to a human eye, as opposed to the photo-cathode of FIG. 6. FIG. 8 is a diagrammatic showing of an embodiment of my invention designed for the measurement of rectilinear displacements, the conventional supporting parts of the apparatus being omitted from the drawing for the sake of clarity, as in FIG. 1. FIG. 9 is a side view of the FIG. 8 embodiment of the invention, showing in somewhat greater detail the relative orientation of the parts.

Referring now to FIG. 1, the apparatus therein illustrated is designed to measure the angular displacement of a rotary shaft 12 with respect to an arbitrary reference position established by a rigid, immovable frame diagrammatically represented in the drawing by the beam 1.

As already mentioned, FIG. 1 is intended to bring out the essential mode of operation of my invention, and conventional supporting parts have therefore been omitted. To the same end, the parts are shown in exploded relation.

Surrounding the shaft 12 and disposed coaxially with respect to it is a circular disc 2, rotatable relative to the frame 1 for purposes of instrument calibration but normally locked to the frame by any suitable means (not shown) when the instrument is in use. Disc 2, shown in plan view in FIG. 2, is divided into a large number of sectors which are alternately opaque and transparent. While FIG. 2 shows the disc 2 as having only a relatively small number of such sector-shaped opaque and transparent areas, this has been done solely to permit convenient pictorial representation; in practice, the number of such sector-shaped areas will usually be substantially greater than shown in FIG. 2. In a typical embodiment where readings are to be taken in degrees, the disc 2 might have 360 transparent sectors and 360 opaque sectors, alike in shape and area. It will be understood, of course, that the markings on such a disc will not in fact be perfect; the machine that marks such a disc will inherently possess sources of periodic error, and such periodic errors will necessarily appear on the completed product, in the form of minute variations in the size and shape of the sectors. The periods of such errors, however, can readily be made much less than the full circumference of the disc; that is, any periodic errors that exist in the marking of the disc 2 will repeat their pattern a number of times.

Disposed below the disc 2 is a disc 3 that is carried on and rotated by the shaft 12 whose annular position is to be determined. Disc 3 is represented in plan view in FIG. 3. As may be seen from that figure, the inner portion of disc 3 is divided into alternate opaque and transparent sector-shaped divisions in generally the same manner as disc 2 already described, save for the fact that the number of sectors on disc 3 differs by some small whole number from the number of sectors or divisions on disc 2. In the typical case already mentioned, where disc 2 has 360 opaque zones and 360 transparent zones, the disc 3 might be divided into 366 opaque zones and 366 transparent zones. As with disc 2, the marked sectors on disc 3 are all alike in shape and area and save for such deviations as may be introduced by periodic error.

It should be noted that the marked sectors on disc 3 are confined to its central portion, the disc having an annular outer part that is entirely transparent. (Alternatively, the disc 3 may be smaller in diameter than disc 2.)

The disc 3 carries at its periphery an indicating pointer 4 which is positioned to overlie and cooperate with a calibrated scale 5 that is rigidly affixed to the frame 1, the scale 5 being of course disposed in a plane parallel to that occupied by the disc 3.

A third disc 16 is disposed coaxially of the shaft 12 but is mounted on the frame 1 for rotation independently of the shaft 12. It is marked with sector-shaped zones, alternately opaque and transparent, in an annular region corresponding in the radial dimension to the all-transparent art of disc 3. The number of these sector-shaped zones on disc 16 differs by a small whole number from the number of such zones on the fixed disc 2; in the example under discussion, wherein angles are to be measured in degrees, minutes, and seconds, the number of such sectors on disc 16 may be the same as the number on disc 3, namely, 366 opaque sectors and 366 transparent sectors.

Disposed over the disc 16 and rigidly attached to it for rotation therewith, is a light-collecting means which, on the drawing, is indicated as having two symmetrically disposed lobes 21 and 22. These elements 21 and 22 consist of transparent bodies of generally arcuate shape and formed of a material, such as Lucite plastic, characterized by a high refractive index, causing it to "trap" light or similar radiation entering it and guiding such radiation onto one or the other of the diffusing surfaces 19 and 20. While arcuately shaped in the radial direction (considering the shaft 12 as a reference), the light-collecting means 21 and 22 have a generally prismatic shape in the axial direction. This is diagrammatically indicated by FIGS. 6 and 7, which are simplified sections (not to scale) of collecting element 22, with the section taken along the dotted line 6, 7–6, 7 of FIG. 5.

To minimize the escape of light from the collecting means 21 and 22, their outer surfaces may be silvered all over, save for the face which adjoins the upper side of disc 16 and the diffusing surfaces 19 and 20 which comprise the light-discharge or exit portions thereof.

The radial dimensions of the collecting means 21, 22 are so chosen as to lie substantially inside the ring-shaped portion of disc 16 that is marked with sector-shaped zones. The assembly which comprises disc 16 and the light-collecting means 21 and 22 is provided on its periphery with an indicating pointer 11 adapted for cooperation with a frame-carried calibrated scale 14, scale 14 being positioned in a plane parallel to that occupied by disc 16.

Disposed above the disc 16 in coaxial relation with the shaft 12 I provide another light-collecting means represented in the drawing as comprising a pair of symmetrical lobes 23 and 24, constructed similarly to the elements 21 and 22 already described save for the fact that they are larger in the radial dimension, so as to overlie the portion of disc 16 that is marked with sector-shaped opaque and transparent zones. The radiation-collecting means 23, 24 is frame-mounted for rotation coaxially with, but independent of, the shaft 12, and it carries on its periphery an indicating pointer 10 adapted for cooperation with a frame-mounted calibrated scale 13. Scale 13, like scales 5 and 14, is mounted in a plane at right angles to the axis of shaft 12 and hence parallel to the plane defined by the lower edge of the collecting means 23, 24. Light entering the collecting means 23, 24 is guided by it to one or the other of the diffusing surfaces 17 and 18, in generally the same manner as already described with respect to the light-collecting means 21, 22.

While the light-collecting means 21, 22 and 23, 24 are shown in the drawing as comprising in each instance a pair of symmetrically disposed prism-like lobes, these elements may if desired be made unitary. In other words, it is not essential to the successful operation of the system that the lobes be physically separated as shown, so long as the symmetrical conformation with respect to the shaft 12 and the respective diffusing surfaces or exit portions is maintained.

A light source (not shown in FIG. 1 but indicated by the numerals 28, 29 in FIG. 4) is disposed below the disc 3 in such a position that light of uniform intensity is directed upward onto the lower face of disc 3, as indicated by the arrows 45 in FIG. 1. While visible light is herein indicated by the arrows 45, it should be understood that other forms of radiation, such as ultraviolet light or infrared light, may be used, either alone or in combination with visible light. In the text of this specification, therefore, including the claim hereof, the term "light" is to be taken in the general sense above indicated.

The operation of the FIG. 1 embodiment of this invention is as follows:

The light 45 impinges in a spatially uniform pattern on the lower side of disc 3 and proceeds axially upward through the system to the extent permitted by the overlapping transparent sectors of discs 3, 2, and 16. Such light as penetrates the inner portion of disc 2 passes through the transparent inner portion of disc 16, enters the collecting means 21, 22, and ultimately illuminates the diffusing surfaces 19 and 20 thereof. Correspondingly, the light which passes through the transparent outer portion of disc 3, and the sector-marked outer portions of discs 2 and 16 enters and is trapped by the collecting means 23, 24, ultimately illuminating the diffusing surfaces 17 and 18 thereof.

In preparing the instrument for a measurement of the angular position of shaft 12, the discs 3 and 16 and the collecting means 23, 24 are all positioned with their respective indicating pointers resting over the respective zeros on the cooperating scales 5, 14, and 13. In this position, the diffusing faces of both collecting means are in alignment and the discs are so positioned that the transmission pattern of light passing through the discs and striking the respective collecting means is symmetrically disposed with respect to the collecting means. (This initial adjustment can most readily be achieved by setting the discs 3 and 16 and the collecting means 23, 24 at positions arbitrarily selected as zero positions, and then rotating disc 2 relative to frame 1 until the necessary symmetrical patterns of light transmission are established. When initial adjustment of the instrument is thus accomplished, disc 2 is locked in place relative to frame 1 and thereafter remains stationary.)

Under the starting conditions above noted, the illumination of diffusing face 19 will be equal to that of diffusing face 20 on the collecting means 21, 22; correspondingly, the illumination of faces 17 and 18 of the collecting means 23, 24 will likewise be equal.

Now suppose shaft 12 is rotated to some new angular position with respect to frame 1, representing an angular displacement to be measured by the apparatus. Since disc 3 is carried by shaft 12 and rotates with it, the light-transmission pattern through the discs will now, in general, be altered. A coarse reading, showing the number of full degrees of rotation of shaft 12 will be indicated by the pointer 4 on scale 5. In general, however, the displacement will not be an exact number of degrees, so that a reading of scale 5 will merely show that the rotation lies somewhere between, for example, 31° and 32°.

The system comprising disc 16 and collector means 21, 22, which rotates as a unit, is now rotated to some new position whereat the illumination of the exit faces 19 and 20 is once more equal. In the example given, this new condition of pattern symmetry will be reached by rotation of disc 16 through an arc not exceeding 30° in one dierection or the other from its zero point, and each degree of rotation of disc 16 will represent one minute of arc of shaft rotation. Hence the scale 14, while physically marked off in degrees, may be calibrated in minutes of arc. To give a practical example: Suppose the coarse reading on scale 5 indicates that the shaft 12 has been rotated through an arc exceeding 31° but slightly short of 32°. Suppose further that a symmetrical light-transmission pattern, as evidenced by equal illumination of faces 19 and 20, is re-established when the disc 16 is rotated to a position representing approximately eleven minutes of arc as indicated on the calibrated scale 14. From this, the operator can determine that the shaft rotation has been approximately 31°49′.

In the general case, however, there will still be an asymmetrical pattern of light transmission through the outer part of the discs and the illumination of the faces 17 and 18 on the collecting means 23, 24 will not be equal. To measure the angle with still further precision, therefore, the collecting means 23, 24 will be rotated until a symmetrical light-transmission pattern is re-established, as indicated by equal illumination of the exit faces 17 and 18. When this has been done, the number of seconds of arc by which the rotation of shaft 12 has exceeded or fallen short of an even minute may be read from the position of pointer 10 on scale 13. Following through the example previously given, if it is noted from scale 14 that the rotation was slightly in excess of 31°49′ but less than 31°50′, the fractional minute may be evaluated by rotating the collector 23, 24 until a symmetrical light-transmission pattern is obtained. If this condition occurs when the pointer 10 is at the position on scale 13 that represents 39 arc-seconds, then the total rotation of shaft 12 will have been evaluated at 31°49′39″. (In the example given, the scale 13 would be calibrated in seconds of arc.)

Persons skilled in the art of precision measurements will realize that the apparatus of FIG. 1 constitutes a goniometer having a two-stage vernier arrangement. It differs from prior-art apparatus of that character, however, in that the readings are obtained by integragating the light passing through large sectors of the marked discs, greatly exceeding the periods of periodic errors in the disc markings, with the result that such errors are almost completely cancelled out and hence do not affect the accuracy of the results.

It will also be recognized by skilled readers that calibration of the various scales in degrees, minutes, and sec-scales may, as desired, be calibrated in decimal fractions onds of arc is purely a matter of arbitrary choice; the scales may, as desired, be calibrated in decimal fractions of degrees, radians, or any other desired units.

Also, it will be understood that the use of a two-stage vernier arrangement is optical, depending on the requirements of the application. If the degree of precision required can be satified with but a one-stage vernier, the light collector 23, 24 and the marked disc 16 may be omitted, the system then comprising simply discs 2 and 3 and collector means 21, 22.

A practical disclosure of such a simplified system is shown in FIGS. 4 and 5, wherein the shaft 12 is shown in a horizontal position and the apparatus of my invention is portrayed as enclosed within a housing 31 surrounding the shaft 12. The light source consists of a plurality of bulbs symmetrically disposed around the shaft 12, represented in FIG. 4 by the bulbs 28 and 29, and the necessary uniform spatial pattern of illumination is provided by diffusing screen 35 disposed between the light source and the marked discs.

In the FIG. 4 embodiment, which shows a single-vernier arrangement, the disc 27 corresponds to disc 3 of FIG. 1, rotating with shaft 12, while disc 26 is held immovable in any suitable manner and thus corresponds to disc 2 of FIG. 1. The collecting means 21, 22 is mounted on the fixed housing 31 for rotation independently of shaft 12 but coaxial therewith. The scale 5, used for coarse measurement of the angle of shaft rotation may conveniently be mounted as shown on the back of housing 31, and the pointer 4 may be suitably mounted on the shaft 12 for cooperation therewith.

With respect to any embodiment of my invention designed for measurement of angles, it will be understood that angles exceeding 360° may conveniently be measured by providing a conventional revolution counter to keep track of the number of complete shaft revolutions occurring after it moves away from its starting position, the apparatus of my invention being then used to measure the angle by which the total rotation exceeds an integral number of complete revolutions.

It will be noted that I have not, in the drawing hereof, disclosed in detail any automatic sensing means for determining when the exit faces of my light-collector means are equally illuminated. In applications not requiring a high degree of precision this may be done simply by visual inspection, as suggested in FIG. 7. When a high degree of precision is required, the presence or absence of equal illumination may be determined by using photocells in conjunction with a balanced bridge circuit. This arrangement is suggested in FIG. 6, where a photo-cathode 33 is shown as the sensing means for determining the degree of illumination of the exit face 19. Circuits for doing this work are well known in the art and will not be described herein, since they do not per se form a part of the present invention.

The principles of my invention may be effectively utilized in the design of apparatus for measuring linear displacements, as well as measuring angles. In FIGS. 8 and 9, a suitable apparatus for that purpose is diagrammatically illustrated.

As shown in FIGS. 8 and 9, a graduated strip 36 is attached to and carried by the element whose translational position is to be determined with respect to some fixed object such as a machine frame. This strip 36 is marked with a plurality of alternately opaque and transparent zones, analogous to the sector zones of the discs used in the angle-measuring embodiments of my invention. In a typical case, the bands may be marked in a uniform pattern comprising 100 alternate transparent and opaque bands per lineal inch of length. Strip 36 is provided with an index pointer 43 adapted for cooperation with a fixed scale 41 carried by the frame or other reference object.

Cooperating with the strip 36 is a corresponding strip 37 which is fixedly carried by the machine frame or other fixed point of reference. (The strip 37 should of course be made longitudinally adjustable within narrow limits for purposes of initial calibration, but in normal use it will be locked in a fixed position on the frame). The strip 37 is marked to define a plurality of alternate opaque and transparent bands disposed in parallel relation to the corresponding bands on strip 36, but the density of the light and dark bands on strip 37 is different by some predetermined amount from the density of the bands on strip 36. Thus, in the example given, strip 37 may be marked so as to have 201 alternate clear and opaque bands in each two-inch lineal segment. The two strips 36 and 37 are superposed as indicated in FIG. 8 and are illuminated by a suitable spatially uniform light source, as represented by bulb 49 and diffusing screen 50.

The light-transmission patterns thus produced after the light has passed through the strips 36 and 37 are collected by a collecting means 38, 39 generally similar in structure and function to the collectors 21, 22 and 23, 24 heretofore discussed and described. The light thus trapped by the collector elements 38 and 39 illuminates the exit faces 46 and 48 respectively.

In order to insure that changes in the illumination of the exit faces 46 and 48 are due to alteration of the pattern of light transmitted through the strips 36 and 37, it is desirable that the light source be at all times positioned directly behind the collector elements 38, 39. To this end, the collector elements 38, 39 are mounted on a sub-frame 44 suitably mounted on the machine frame or other stationary reference object, the sub-frame 44 being movable through a limited range in the direction defined by the plane of strip 36. The light source 49, 50 is likewise mounted on the sub-frame 44 so that it moves back and forth with respect to the strips 36 and 37 to the same extent as the light collectors 38, 39. An indicating pointer 42 is mounted on sub-frame 44 for cooperation with a calibrated scale 40 that is rigidly affixed to the machine frame.

The operation of the embodiment of FIGS. 8 and 9 is directly analogous to that of the other embodiments previously described. An initial zero position is determined when the object whose translation is to be measured is at rest relative to the frame of reference, the strip 37 being adjusted on the frame of reference to a position that provides a symmetrical light-transmission pattern through the strips, resulting in equal illumination of the exit faces 46 and 48. The strip 37 is then locked in position. Thereupon, when the object whose translation is to be measured has moved to its new position, the strip 36 will have been displaced by an equal amount, the coarse magnitude of such displacement being indicated on the scale 41 by the pointer 43. In general, however, the pattern of symmetrical light transmission through the strips will have been disturbed by the displacement, unless such displacement happens to have been an exact number of units as marked on scale 41.

To evaluate the amount of displacement in excess of an integral unit, the sub-frame 44 is moved relative to the strips 37 and 36 until a position is located whereat the pattern of light transmission is again symmetrical, as indicated by equal illumination of the exit faces on the collectors 38 and 39. At this position, the reading of pointer 42 on scale 40 will show the fractional part of a unit by which the displacement has exceeded an integral number.

As with the embodiments of the invention already described, this form of my invention enjoys a great advantage over the usual vernier system of the prior art, in that my invention integrates and hence substantially eliminates all periodic errors inherent in the marking of the graduated strips 36 and 37. This makes possible readings far more accurate than could be obtained with prior-art apparatus of equal precision in machining and construction.

Skilled readers will appreciate the fact that the alternate zones into which my indexing discs and strips are divided need not be totally opaque or totally transparent. For successful operation of my invention, it is sufficient that one set of such zones or segments be relatively opaque with respect to the other set. Similarly, it is not essential that the transparent zones or segments be transparent in the strict sense; it is sufficient if they are translucent. When the terms "opaque" and "transparent" are used in the descriptive matter and claims of this specification, therefore, it is to be understood that they are intended to have the relative sense above described and are not used in their absolute sense.

While I have in this specification described at considerable length certain typical embodiments of my invention, it should be understood that these are illustrative only. The scope of my invention is to be determined primarily by reference to the appended claim.

I claim:

Apparatus for determining the angular position of first and second elements, said elements being at least partially overlapping, the first of such elements being rotatably movable with respect to the second around a common axis of rotation, each of said first and second elements being provided with graduations in the form of substantially identical sector-shaped zones that are alternately opaque and transparent, the spatial density of said zones on one of said elements being slightly different from that on the other of said elements and the radial extension of the zones on said second element being greater than that of the zones on said first element, thus providing on said second element an arcuate graduated area that is non-overlapping with respect to the graduated area of said first element, comprising a light source positioned and operative to direct light through a portion of said elements embracing a large plurality of said zones on both elements and including at least a part of said non-overlapping graduated area of said second element, the intensity of said light impinging on the various parts of said elements being substantially uniform, a first light-collecting means disposed adjacent said elements on the opposite side thereof from said light source, to receive light from said source after it has passed through said elements, said first light-collecting means being bilaterally symmetrical in shape with respect to an axis of symmetry passing through said common axis of rotation and having a pair of exits, said collecting means being operative to guide to one of said exits the light impinging thereon from an area of said overlapping portion of said first and second elements on one side of said axis of symmetry and to guide to the other of said exits the light impinging on said means from an area of said overlapping portion of said first and second elements on the other side of said axis of symmetry, said two areas being equal in magnitude and sufficiently great to include a large plurality of said opaque and transparent zones on said first and second elements, said first light-collecting means being rotatable independently of said first and second elements through at least a limited arc around said common axis of rotation, a third element mounted for rotation around said common axis of rotation and being keyed to said first light-collecting means for rotation in unison therewith, said third element being provided with graduations in the form of substantially identical sector-shaped zones generally like those on said first and second elements and having a spatial density slightly different from that of said second element, the zones on said third element being disposed thereon in a position ovrelapping the graduated portion of said second zone that does not overlap the first-element zones, and a second light-collecting means generally similar to said first light-collecting means and mounted for rotation around said common axis of rotation, said second light-collecting means being adapted to receive and guide to its own pair of exits the light from said source which passes through the overlapped graduated portions of said second and third elements.

References Cited by the Examiner
UNITED STATES PATENTS
2,557,219   6/1951   Flint et al.

ISAAC LISANN, *Primary Examiner*.